United States Patent
Nad et al.

(10) Patent No.: US 8,467,652 B2
(45) Date of Patent: Jun. 18, 2013

(54) GLASS FIBER CONNECTION MODULE

(75) Inventors: Ferenc Nad, Berlin (DE); Ulrich Hetzer, Mahlow (DE); Frank Mössner, Berlin (DE)

(73) Assignee: ADC GmbH, Berlin (DE)

( * ) Notice: Subject to any disclaimer, the term of this patent is extended or adjusted under 35 U.S.C. 154(b) by 318 days.

(21) Appl. No.: 12/918,633

(22) PCT Filed: Jan. 12, 2009

(86) PCT No.: PCT/EP2009/000102
§ 371 (c)(1),
(2), (4) Date: Aug. 20, 2010

(87) PCT Pub. No.: WO2009/103382
PCT Pub. Date: Aug. 27, 2009

(65) Prior Publication Data
US 2010/0329626 A1 Dec. 30, 2010

(30) Foreign Application Priority Data
Feb. 22, 2008 (DE) .......................... 10 2008 010 592

(51) Int. Cl.
*G02B 6/00* (2006.01)
(52) U.S. Cl.
USPC .......................................................... 385/135

(58) Field of Classification Search
USPC .......................................................... 385/135
See application file for complete search history.

(56) References Cited

U.S. PATENT DOCUMENTS

| | | | |
|---|---|---|---|
| 4,658,764 A | 4/1987 | Miura et al. | |
| 5,142,606 A | 8/1992 | Carney et al. | |
| 6,061,492 A * | 5/2000 | Strause et al. | 385/135 |
| 6,504,987 B1 | 1/2003 | Macken et al. | |
| 6,731,851 B2 * | 5/2004 | Sato et al. | 385/135 |
| 7,474,828 B2 * | 1/2009 | Leon et al. | 385/135 |
| 2009/0067802 A1* | 3/2009 | Hoehne et al. | 385/135 |
| 2010/0014816 A1* | 1/2010 | Hetzer et al. | 385/92 |
| 2011/0268408 A1* | 11/2011 | Giraud et al. | 385/135 |
| 2011/0268411 A1* | 11/2011 | Giraud et al. | 385/135 |
| 2011/0268412 A1* | 11/2011 | Giraud et al. | 385/135 |
| 2011/0274402 A1* | 11/2011 | Giraud et al. | 385/135 |

FOREIGN PATENT DOCUMENTS
EP 0 645 657 3/1995

* cited by examiner

*Primary Examiner* — Sung Pak
(74) *Attorney, Agent, or Firm* — Merchant & Gould P.C.

(57) ABSTRACT

The invention relates to an optical fiber connection module, comprising a housing (1) for accommodating optical fiber connection interfaces, the housing (1) being formed with first fixing means (9) in order to fix the optical fiber connection module on round bars (11), the housing (1) being formed with second fixing means (13) in order to fix the optical fiber connection module to round bars (11), the second fixing means (13) being arranged offset towards the rear with respect to the first fixing means (9).

11 Claims, 5 Drawing Sheets

GLASS FIBER CONNECTION MODULE

This application is a National Stage Application of PCT/EP2009/000102filed 12 Jan. 2009, which claims benefit of Serial No. 10 2008 592.9, filed 22 Feb. 2008 in Germany and which applications are incorporated herein by reference. To the extent appropriate, a claim of priority is made to each of the above disclosed applications.

BACKGROUND

The invention relates to an optical fiber connection module, comprising a housing for accommodating optical fiber connection interfaces, the housing being formed with first fixing means in order to fix the optical fiber connection module on round bars.

Optical fiber connection modules often have a front panel with receptacles for couplings or adapters for accommodating optical fiber pieces on both sides (from the inside and the outside). At least one optical fiber cable is fed at least from the rear side of the connection module and is then split in the interior of the housing, the individual fibers then being inserted with a plug into the rear side of the couplings or adapter (instead of an optical fiber cable a plug can also be provided). The cable feed can also take place via a multifiber plug combination (female plug, adapter, male plug), from which wires with plugs then directly emerge. The problem arises of how the plugs on the rear side of the couplings or adapters are intended to be cleaned since they can only be reached with difficulty.

SUMMARY

The invention is therefore based on the technical problem of providing an optical fiber connection module which makes improved handling of the connection module possible.

In this regard, the optical fiber connection module comprises a housing for accommodating optical fiber connection module interfaces, the housing being formed with first fixing means in order to fix the optical fiber connection module to round bars, the housing being formed with second fixing means in order to fix the optical fiber connection module on round bars, the second fixing means being offset towards the rear side with respect to the first fixing means. The first and second fixing means are preferably each arranged on side faces of the housing. This makes it possible to draw the connection module from a first operating position, in which the connection module is held by the first fixing means, forwards by the round bars into a second service position, the connection module being held by the second fixing means in this second service position. In this case, the connection module is preferably additionally supported on connection modules arranged beneath it. The holding force or spring force of the first and second fixing means is preferably designed in such a way that the holding force of the second fixing means is lower than that of the first fixing means in order not to make the latch-on operation into the first position unnecessarily difficult. In the second service position, the plugs which are arranged in the interior of the housing can be accessed more easily.

In a preferred embodiment, the first and second fixing means are designed to be integral with a housing part, with the result that they can be produced, for example, as a plastic injection-molded part.

In a further preferred embodiment, the housing is formed completely from plastic.

In a further preferred embodiment, a front panel for accommodating couplings or adapters is arranged on the front side of the housing, the front panel being designed to be pivotable, with the result that the plugs located behind it can be accessed even more easily.

In a further preferred embodiment, the first fixing means are in the form of arcuate snap-action elements, on whose end side in each case one feed lever is arranged. By means of the feed lever, the arcuate snap-action element can be bent up and thus the latch-on and unlatching operations are simplified.

In a further preferred embodiment, the second fixing means are in the form of resilient lugs.

In a further preferred embodiment, the lugs have depressions for accommodating the round bars.

In a further preferred embodiment, the housing has receptacles for plugs and a cable.

In a further preferred embodiment, the housing comprises a housing part, which forms, by means of a further housing part, a radius-shaping cable outlet, the second housing part having the receptacles for the plugs.

In a further preferred embodiment, the housing part has elements for closing the receptacles for the plugs, the elements being formed with predetermined breaking points.

In a further preferred embodiment, elements for accommodating the reserve length of a cable are arranged beneath the housing part, and elements for accommodating the reserve length of wires are arranged on the housing part. As a result, all of the wires can be designed to be of the same length, with it being possible for the different reserve lengths as a result of the different positions of the couplings to be accommodated easily on the front panel.

BRIEF DESCRIPTION OF THE DRAWINGS

In a further preferred embodiment, the housing has strain relief means for cables which is formed with a predetermined breaking point.

The invention will be explained in more detail below with reference to a preferred exemplary embodiment. In the figures.

DETAILED DESCRIPTION

Figure 1:
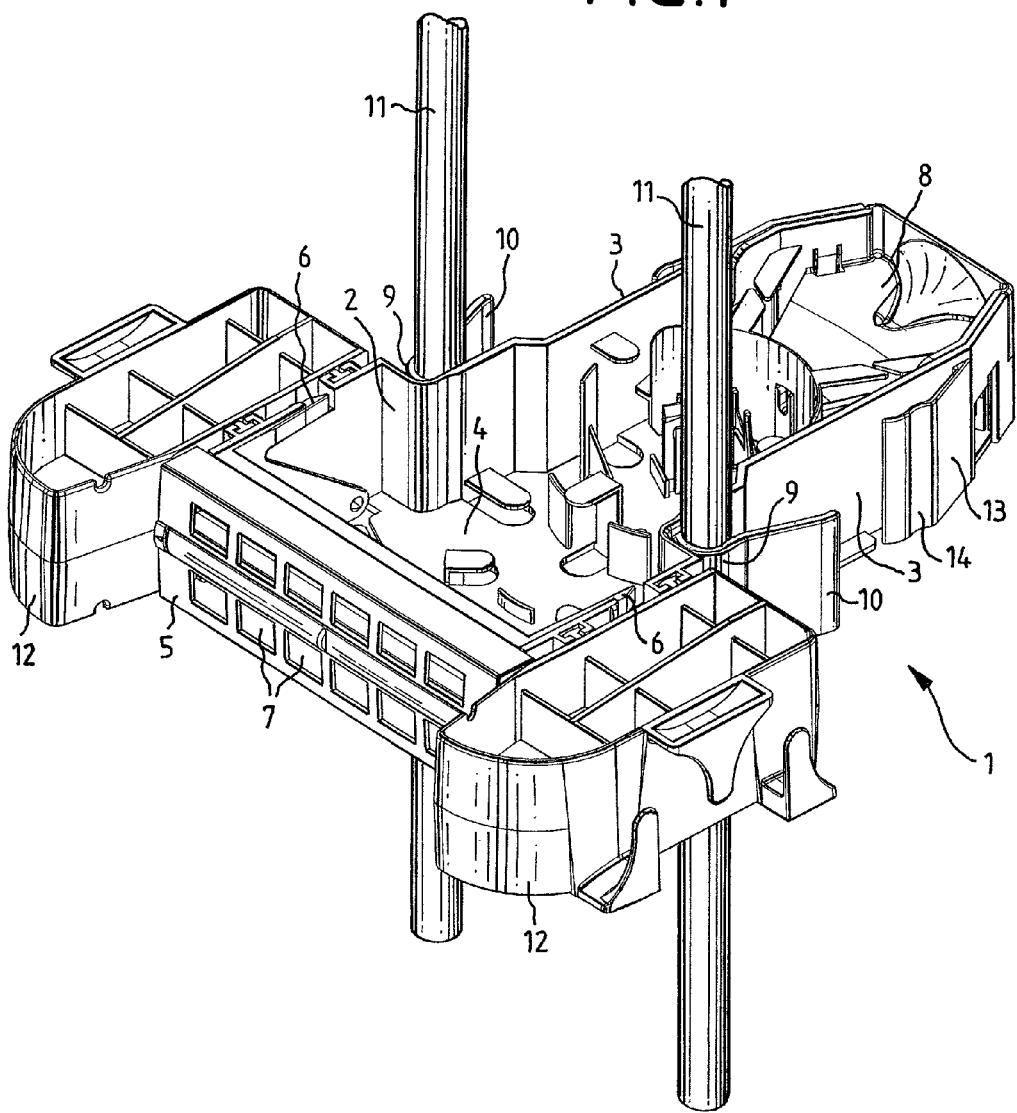
FIG. 1 shows a housing of an optical fiber connection module in a perspective front view in a first position.
Figure 2:
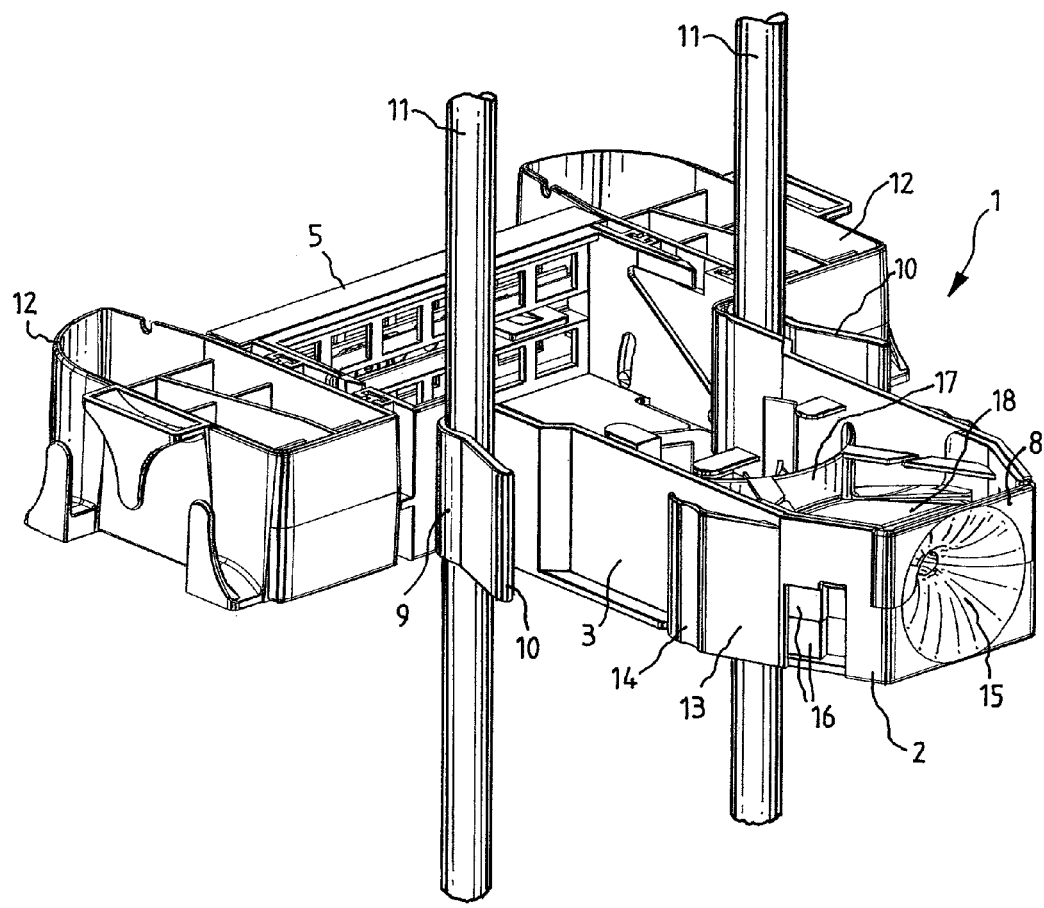
FIG. 2 shows the housing in a perspective rear view in the first position.
Figure 4:
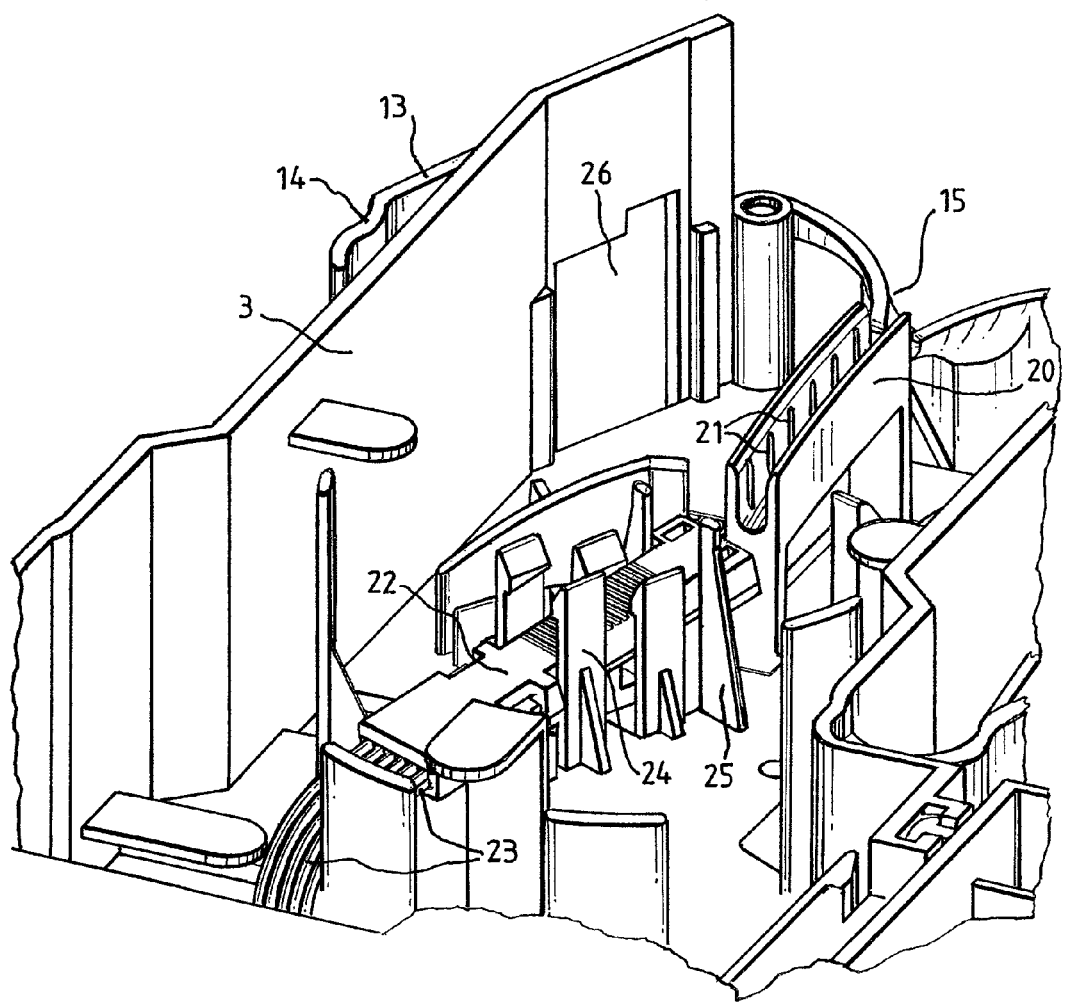
FIG. 4 shows a perspective front view of part of a base part of the housing.
Figure 5:
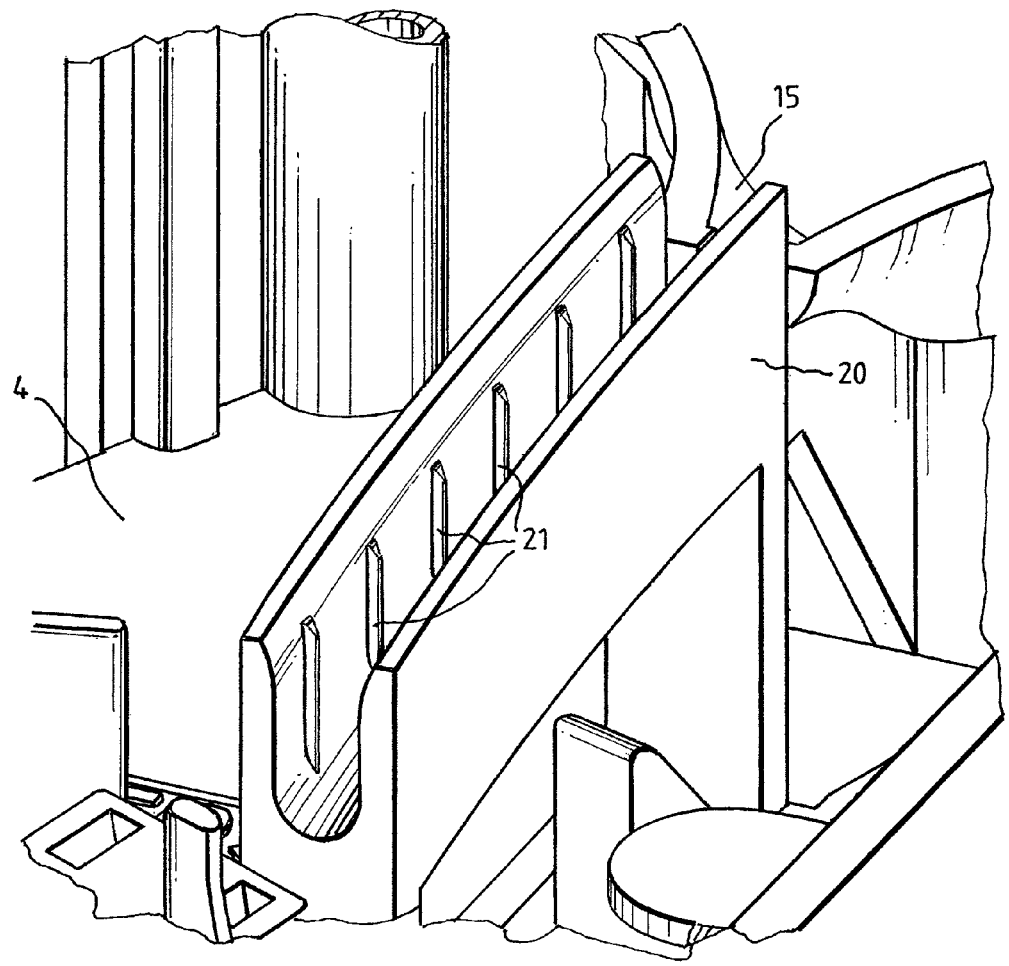
FIG. 5 shows a perspective front view of strain relief means.

FIG. 1 illustrates a housing 1 of an optical fiber connection module. The housing 1 is made completely of plastic. The housing 1 has a first housing part or base part 2, which has side walls 3 and a bottom face 4. Cable guides 12 are latched laterally onto the base part 2. A front panel 5 is latched on to the front side and can be unlatched by means of latching clips 6, it being possible for the front panel 5 to be lifted up in the unlatched position so that it can then be pivoted down. The front panel 5 also has receptacles 7 for couplings and adapters, which are not illustrated. A further housing part 8 is latched on the rear side. Two first fixing means 9 are arranged on the side walls 3 of the base part 2, and a feed lever 10 is arranged on the end side of said fixing means. The first fixing means 9 are in this case in the form of arcuate snap-action elements, which, in the first position illustrated, engage around two round bars 11 and thus fix the housing 1. Furthermore, two second fixing means 13 are arranged on the side walls 3, which fixing means 13 are in the form of resilient lugs. In this case, the resilient lugs have depressions 14 for accommodating the round bars 11 if the optical fiber connection module is moved into the second position (see FIG. 3). The further housing part 8 forms, together with the base part 2, a radius-shaping cable outlet 15 on the rear side of the housing 1. This cable outlet 15 is preferably dimensioned in such a way that two microdistribution cables can be passed through. The microdistribution cable(s) is/are then guided in a strain relief means 20 (see FIGS. 4 and 5), which is hidden by the housing part 8, the strain relief means 20 being formed by teeth 21. Furthermore, the strain relief means 20 is bent radially downwards (in a viewing direction from the rear to the front), so that strain relief means is ensured even when only one cable is used and the cable does not have any play at the top. The strain relief means 20 is arranged directly in front of the cable outlet 15. Furthermore, a receptacle comprising latching hooks 24 and bearing elements 25 for one or two fan-out elements 22 is arranged on the bottom face 4, in which fan-out elements 22 the cables are split into individual fibers, which are then preferably passed on, enveloped by protective sleeves 23, in the housing 1 (see FIG. 4). Then, plugs are arranged at the ends of the optical fibers, which plugs are then plugged into the rear side of the couplings into the receptacles 7. Furthermore, the housing 8 has elements 16 for closing openings 26 (see FIG. 4) for multiple plug combinations, the openings 26 being arranged on the two side walls 3 of the base part 2 and each being capable of accommodating two plugs. If these plugs are used instead of the microdistribution cables, the elements 16 are severed at the predetermined breaking points. When using only one plug, only the lower element 16 is severed. Wires are passed into the housing 1 via these plugs, where in this case the strain relief means is then preferably likewise severed at a predetermined breaking point. The housing part 8 on the upper side has a radius 17, so that a winding plane 18 for wires is formed between the radius 17 and the rear wall of the housing 1, with the result that the individual wires with different reserve lengths can be stored, the wires with a shorter reserve length being guided more tightly at the radius 17. These reserve lengths are necessary in order to follow up with wire length when the front panel is pivoted. Furthermore, the wire lengths are typically equally long, but, depending on the position of the couplings in the front panel 5, different wire lengths are required. This can then be compensated for by the different reserve lengths. In this case, there is also a clear separation of reserve lengths of cables and wires, the cables being wound beneath the housing part 8 and the wires being wound on the winding plane 18.

Figure 3:
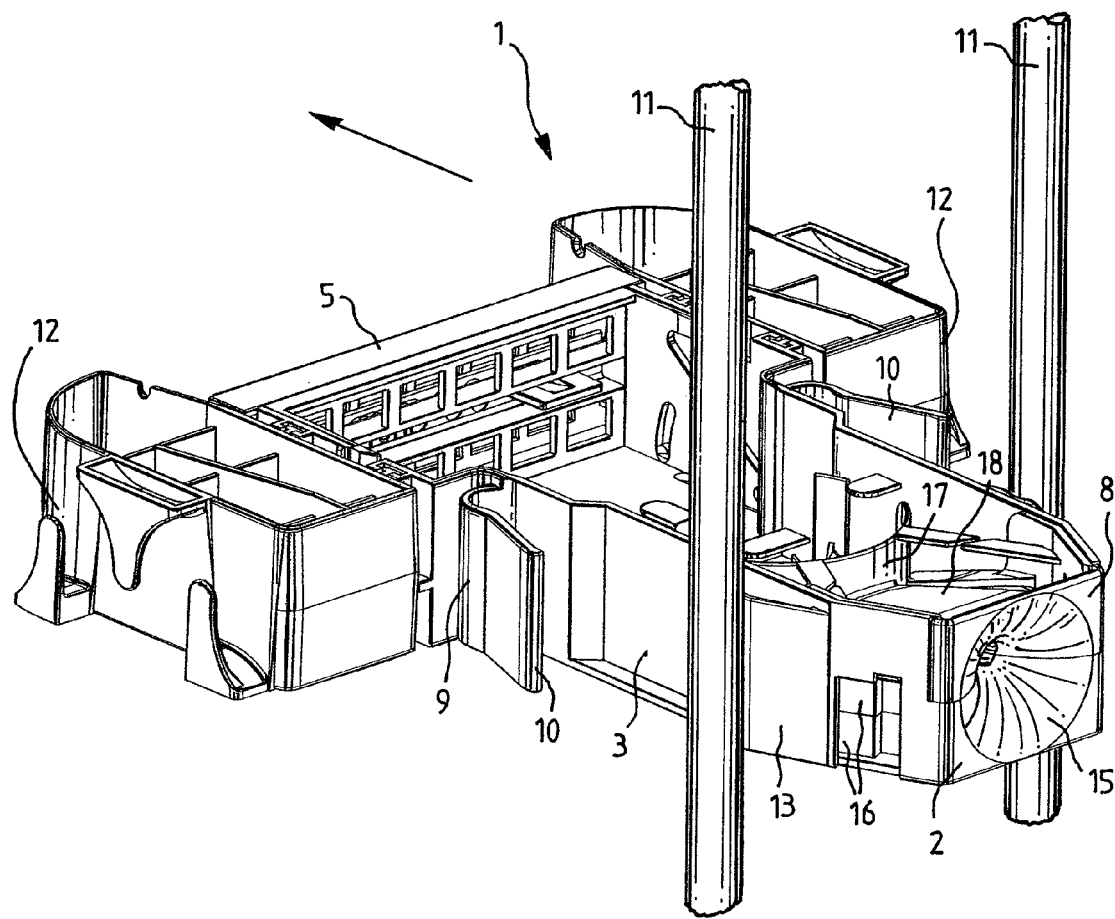
FIG. 3 shows the housing in a perspective rear view in a second position.

In particular in order to clean the plugs which have been plugged into the rear side of the couplings in the receptacles 7, the housing 1 is drawn forwards (in the arrow direction, see FIG. 3). In order to simplify this operation, the feed levers 10 are pressed outwards. If the housing 1 is then drawn further down, it ultimately snaps in on the second fixing means 13, which is illustrated in FIG. 3.

List of Reference Symbols
1 Housing
2 Base part
3 Side walls
4 Bottom face
5 Front plate
6 Latching clips
7 Receptacles
8 Housing part
9 First fixing means
10 Feed levers
11 Round bars
13 Second fixing means
14 Depressions
15 Cable outlet
16 Elements
17 Radius
18 Winding plane

The invention claimed is:

1. An optical fiber connection module, comprising:
a housing for accommodating optical fiber connection interfaces, the housing being formed with first fixing means in order to fix the optical fiber connection module on round bars,
wherein the housing is formed with second fixing means in order to fix the optical fiber connection module to round bars, the second fixing means being arranged offset towards the rear with respect to the first fixing means,
wherein the housing has receptacles for plugs and a cable, and wherein the housing has elements for closing the receptacles for the plugs, the elements being formed with predetermined breaking points.

2. The optical fiber connection module as claimed in claim 1, wherein the first and second fixing means are designed to be integral with a housing part.

3. The optical fiber connection module as claimed in claim 1, wherein the housing is formed completely from plastic.

4. The optical fiber connection module as claimed in claim 1, wherein a front panel for accommodating couplings or adapters is arranged on the front side of the housing, the front panel being designed to be pivotable.

5. The optical fiber connection module as claimed in claim 1, wherein the first fixing means are in the form of arcuate snap-action elements, on whose end side a feed lever is arranged.

6. The optical fiber connection module as claimed in claim 1, wherein the second fixing means are in the form of resilient lugs.

7. The optical fiber connection module as claimed in claim 6, wherein the lugs have depressions for accommodating the round bars.

8. The optical fiber connection module as claimed in claim 1, wherein the housing comprises a housing part, which forms, by means of a further housing part, a radius-shaping cable outlet, the further housing part having the receptacles for the plugs.

9. The optical fiber connection module as claimed in claim 8, wherein the housing part has the elements for closing the receptacles for the plugs.

10. The optical fiber connection module as claimed in claim 8, wherein elements for accommodating the reserve length of a cable are arranged beneath the housing part, and elements for accommodating the reserve length of wires are arranged on the housing part.

11. The optical fiber connection module as claimed in claim 1, wherein the housing has strain relief means for cables which is formed with a predetermined breaking point.

* * * * *